United States Patent [19]

Davidson

[11] 4,224,601
[45] Sep. 23, 1980

[54] ELECTRODYNAMIC PRINTING SYSTEM

[76] Inventor: Sam A. Davidson, 111 Glenn Way #9, Belmont, Calif. 94002

[21] Appl. No.: 890,283

[22] Filed: Mar. 27, 1978

[51] Int. Cl.² ...................... G03G 17/00; G01D 15/08
[52] U.S. Cl. .................................. 346/150; 346/162; 346/165
[58] Field of Search ............... 346/150, 151, 162–164, 346/165, 139 C, 158–160

[56] References Cited

U.S. PATENT DOCUMENTS

| 2,596,446 | 5/1952 | Stamper | 346/162 |
|---|---|---|---|
| 3,048,551 | 8/1962 | Lutz | 260/28.5 |
| 3,060,045 | 10/1962 | Malakoff | 106/270 |
| 3,283,309 | 11/1966 | Gaynor | 346/160 |
| 3,312,648 | 4/1967 | Guttman | 260/28.5 |
| 3,355,743 | 11/1967 | Capps | 346/153 |
| 3,409,574 | 11/1968 | Gros | 260/23 |
| 3,427,633 | 2/1969 | Waterman | 346/139 C |
| 3,491,043 | 1/1970 | Zmitrovis | 260/23.5 |
| 3,751,159 | 8/1973 | Fisher | 346/158 |
| 3,786,518 | 1/1974 | Atherton | 346/163 |
| 4,017,366 | 4/1977 | Hsieh | 346/165 |

OTHER PUBLICATIONS

IBM Technical Disclosure Bulletin, vol. 19, No. 4, p. 1433–1434, Sep. 1976, Piezoelectric Braille Module.

Primary Examiner—Jay P. Lucas
Attorney, Agent, or Firm—Townsend and Townsend

[57] ABSTRACT

An electrodynamic printing system with at least one conductive stylus electrode against the back side of a sheet to be written upon and a store of solid conductive writing material, preferably in a roller electrode form, disposed on the opposite side of the sheet. A circuit is provided to apply current pulses between the electrodes causing current flow therebetween through the sheet sufficient to erode writing material from the front electrode and cause it to become implanted on the sheet, for forming a writing pattern. A linear array of stylii aligned with the roller provides a line printer apparatus.

63 Claims, 7 Drawing Figures

ELECTRODYNAMIC PRINTING SYSTEM

BACKGROUND OF THE INVENTION a. Field of the Invention

The invention relates generally to printing and copying systems and in particular to non-impact electronic printing and copying.

b. Prior Art

Previously, most non-impact printers and copiers have relied upon the formation of an electrostatic latent image to which a toner is subsequently applied for forming visible image on paper. In the prior art, others have realized the advantage of omitting the step which consists of forming an electrostatic latent image. In some instances, this has been accomplished by printing directly on paper, by accelerating charged particles and fusing them to paper. For example, in U.S. Pat. No. 3,751,159 Fisher teaches use of a copying system using a wire matrix to accelerate ionized toner particles from a cylindrical bar of compressed toner particles held together by a binder. The bar is spaced from the wire matrix so that a paper web can pass therebetween. The ionized toner particles travel toward the wire matrix when energized until stopped by the paper, thereby leaving a visible image.

In U.S. Pat. No. 3,427,633 Waterman teaches the use of conductive toner particles on and in a web next to scanning electrodes which cause localized heating so that the toner particles are transferred to paper beneath the web by minute explosive action.

In U.S. Pat. No. 3,355,743 Capps teaches that a belt or web can carry toner particles between two electrodes. Sheet material, such as paper also passes between the electrodes. The electrostatic field between the electrodes causes previously charged dielectric toner particles to be accelerated and adhere to the paper.

Previously, electronic dot matrix line printers have relied upon a high voltage discharge between an array of fine wires and a backing electrode, or metallized paper for marking the paper. In some instances, holes were burned in the paper opposite the wires which were energized. In other instances, the paper was responsive to thermal energy generated by the electrode so that a dot was produced in areas of intense localized heating. In still other instances, such as the Fisher Patent, toner particles were caused to become accelerated from the backing electrode and fused to the paper. The dot matrix approach to line printing is extremely useful in digital electronics, especially in computer applications where large amounts of output data exist.

An object of the invention was to devise a non-impact, all electronic printing system which prints at least as well as prior art mechanical printing press systems by relying on dynamic current flow through the recording medium from an eroding electrode of writing material to create an immediate image, rather than from the formation of an electrostatic image requiring further processing and developing.

Another object was to devise a printing system which could be adapted to high speed line printing.

Another object was to devise a standardized miniature printing module which could be used in many kinds of printing instrument such as typewriters and photocopiers.

SUMMARY OF THE INVENTION

The above objects have been achieved in a printing material, process, and system wherein at least one conductive writing stylus is disposed on a back side of a sheet of plain paper to be written upon. A store of solid, electrically conductive writing material is disposed on the front side of a sheet opposite the stylus and in close enough proximity so that writing material can erode and flow onto the front side of the paper when energized. A current path is established between the stylus and the store of writing material by providing a pulsed current filament through the paper fibers for conduction through the paper. Bits of writing material are eroded from the store and flow onto the fibers of the paper sheet where they are embedded. Current intensity and duration are limited so that holes are not formed in the paper.

The back electrode may be an array of fine stylii, as in a dot matrix printer for printing an entire line at a time. The thermoplastic writing material may be microcrystalline wax or paraffin wax, made electrically conductive, and mixed with coloring agents and character modifying additives.

DETAILED DESCRIPTION

Figure 1:
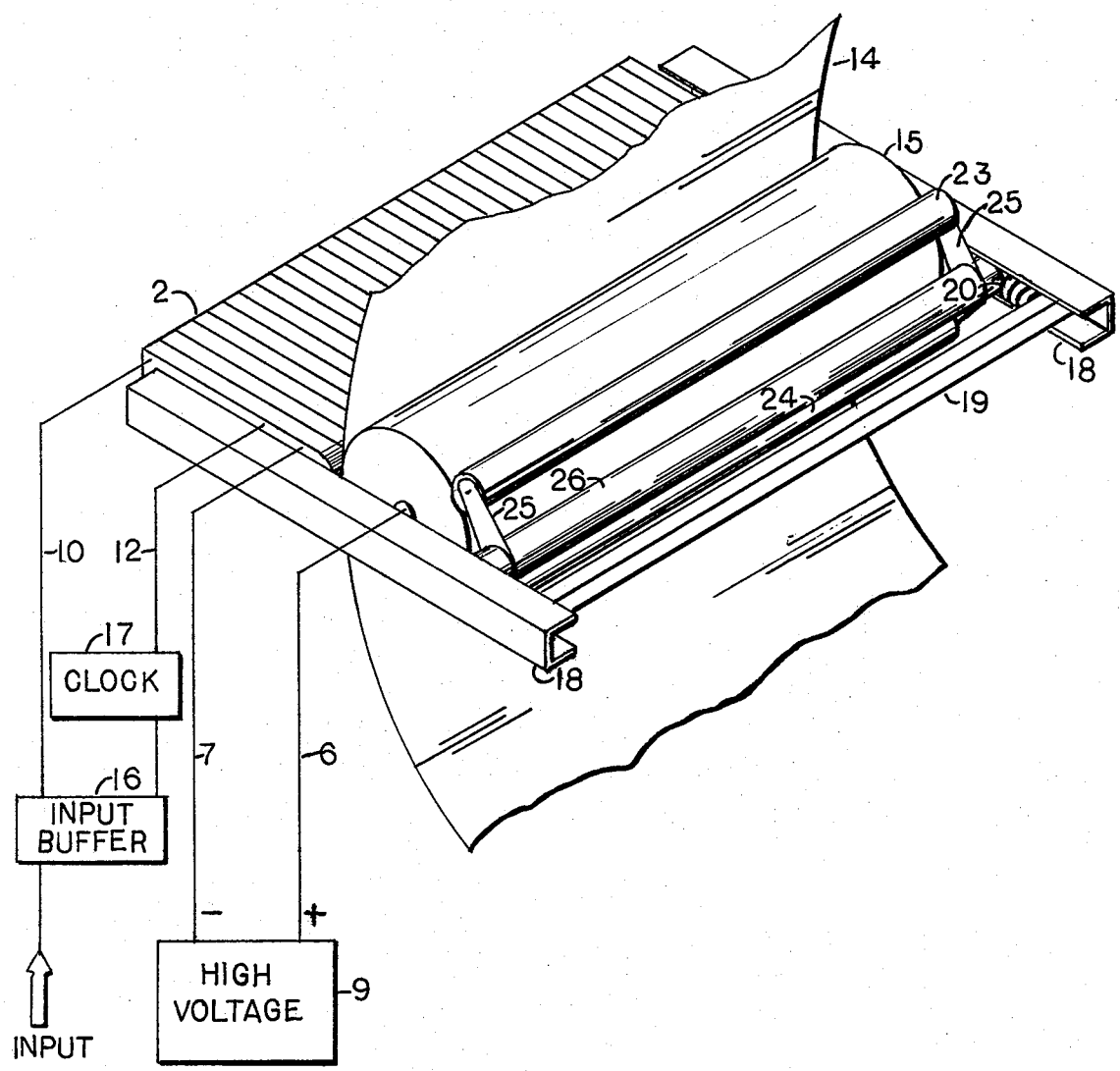
FIG. 1 is a perspective view of the electrodynamic printing system of the present invention.
Figure 2:
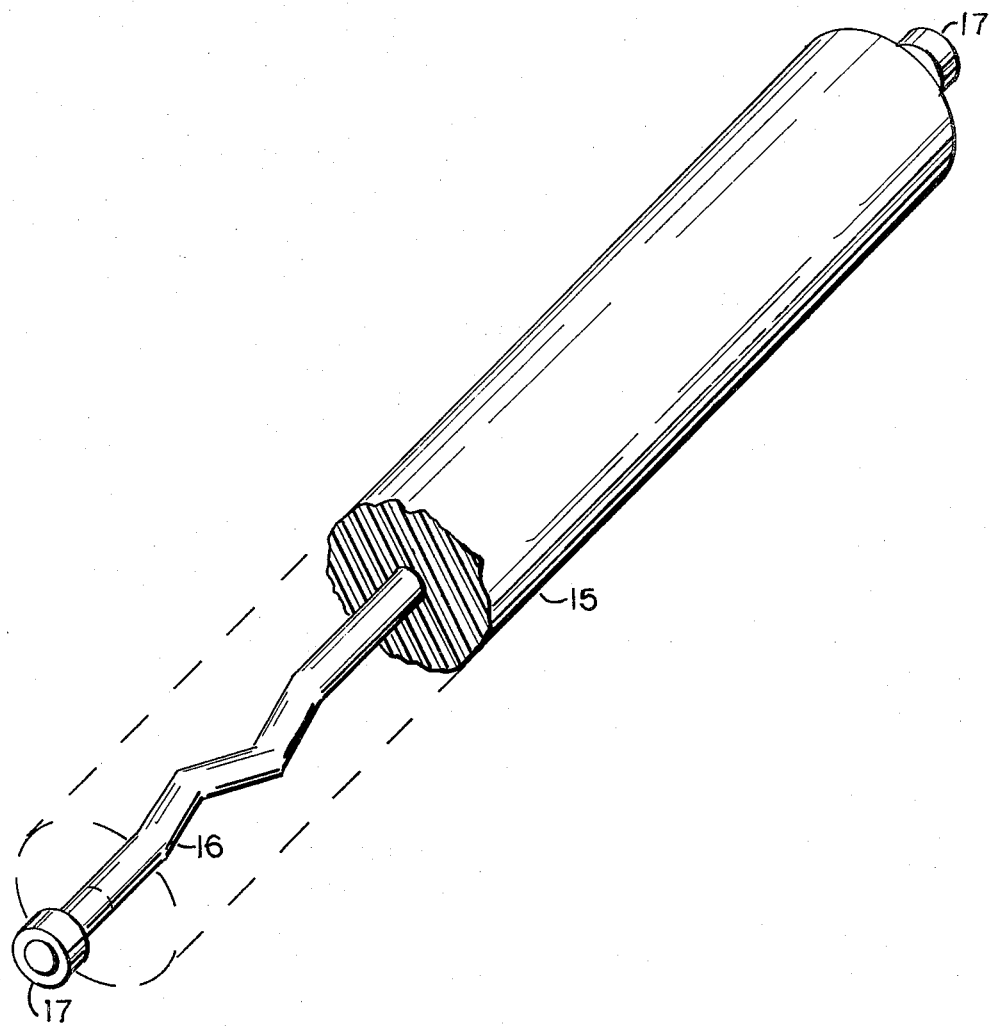
FIG. 2 is a perspective view of an electrode having a store of solid writing material for use in the apparatus of FIG. 1.

Referring to FIG. 1 there is shown an electrodynamic printer with monochromatic printing capabilities consisting of the crayon roller 15 in snug horizontal contact with the front side of a sheet of ordinary paper 14 while said paper 14 is moving vertically. Said paper 14 is in turn in snug contact with the writing edge of a horizontally positioned electrodynamic print head 2 possessing autonomic addressing means for raster scanning the point electrode writing styli 1 encapsulated therein and which emerge along the front writing edge, and contact said paper 14 when said paper 14 is inserted between said print head's 2 writing edge and the crayon 15. A high voltage power supply 9 is connected to the crayon roller 15 and to the autonomic print head 2 so as to enable the print head 2 to produce images upon the paper 14 in direct response to commands which arrive at the print head 2 from the input buffer 16.

For purposes of definition, the front side or front surface of the paper 14 shall be defined as that side or surface of the paper 14 upon which the image is produced, and from which side it is normally viewed. Said crayon roller 15 is snugly positioned against said front surface. The line of contact between said crayon 15 and said paper 14 being the line of origin of the image which becomes printed on said paper 14, in a line vertical to the motion of the paper 14. The back side of the paper 14 is defined as that side or that surface opposite from the front side. The print head 2 is positioned against the back side of the paper 14 so the printing edge of the print head 2 presses snugly against the same line of contact as the crayon roller 15 makes with the paper 14, but said print head 2 is on said back side of said paper 14 whereas crayon roller 15 is on said front surface. The aligned print head 2 and crayon roller 15 with paper 14 between them, are pushed toward each other by a moderate force exerted by springs 20,21 at either end of said two components in the plastic channel 18, in which all the components are mounted. The exact magnitude of said force being uncritical and adequately defined merely as moderate or snug, and only of sufficient magnitude as to assure simple positive contact between said crayon 15, said paper 14, and said print head 2, without being so great as to hinder the freerolling nature of the crayon 15 in its bearings 17, or to cause undue friction or damage to any of the aforementioned components. Such an amount of force alone is insufficient to cause to transfer to the paper 14 any of the writing material of which said crayon 15 is composed. When paper 14 is not present between crayon 15 and print head 2, said force is released by removing the external force exerted upon member 19, which then allows springs 22 to move crayon roller 15 directionally away from print head 2, creating a space therebetween. When paper 14 is inserted and all 3 components, print head 2, paper 14 (paper being a necessary component of this sort of printing electronics), and crayon roller 15, are in snug contact and good alignment with each other, electronic signals transmitted from the autonomic print head 2 on the back side of the paper 14 cause images to be immediately, permanently, and visibly printed onto the front surface of the paper 14 in the following manner:

Input print signals originating from a variety of sources including but not limited to keyboards, computers, and image sensors arrive at the input buffer 16 through either parallel or serial input ports of said buffer 16 for purpose of synchronization with the clocked operating cycles of the autonomic print head 2, said buffer 16 and said print head 2 being connected to same clock means 17. The input buffer 16 converts parallel-in data to serial-out, does not alter serial-in data except to hold it on a FIFO basis. Said input buffer 16 holds all arriving data until its registers fill up and cause a line-feed signal to be generated, or in the case of a shorter line being transmitted for printing, the input data itself will contain a line-feed signal at the desired point. The input buffer 16 contains n registers, corresponding to n registers 5 in the shift register 31 of the print head 2, and n styli in the print head 2, all of which correspond to the number of total dots the print head 2 can print horizontally across a sheet of paper 14.

Figure 6:
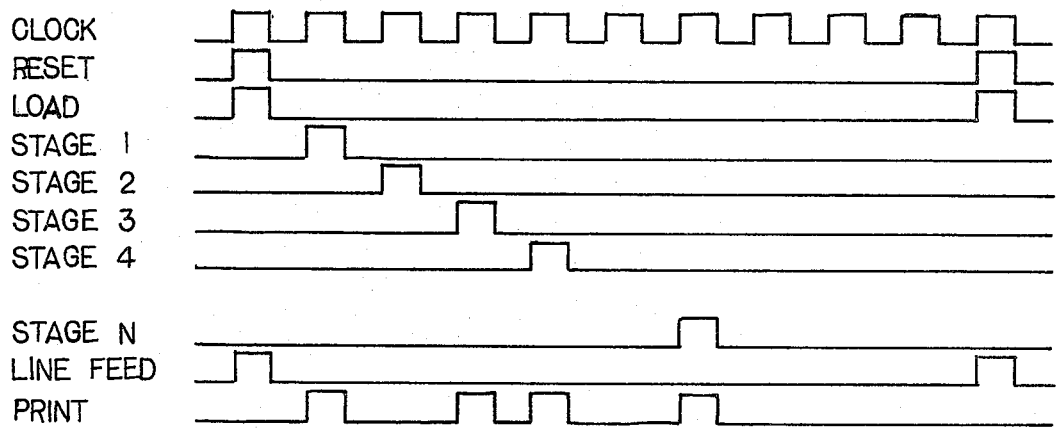
FIG. 6 is a timing diagram of wave forms used in the electrodynamic printing system of the present invention.

Referring to FIG. 6 it is seen that the generation of a line-feed signal causes the autonomic print head 2 to begin a new raster scan cycle. Using the techniques hereinafter described, it is seen that the incoming data, which is transmitted immediately following each line-feed signal, will be time sequenced so that incoming print signals will arrive only at the exact time when it is possible for them to be transmitted by AND gates 4 admitting them only to their selective styli 1, and to no other incorrect styli 1. Said incoming print signals only need be arranged in serial order corresponding to the order in which they are to be printed, no other address encoding being required.

Figure 5:
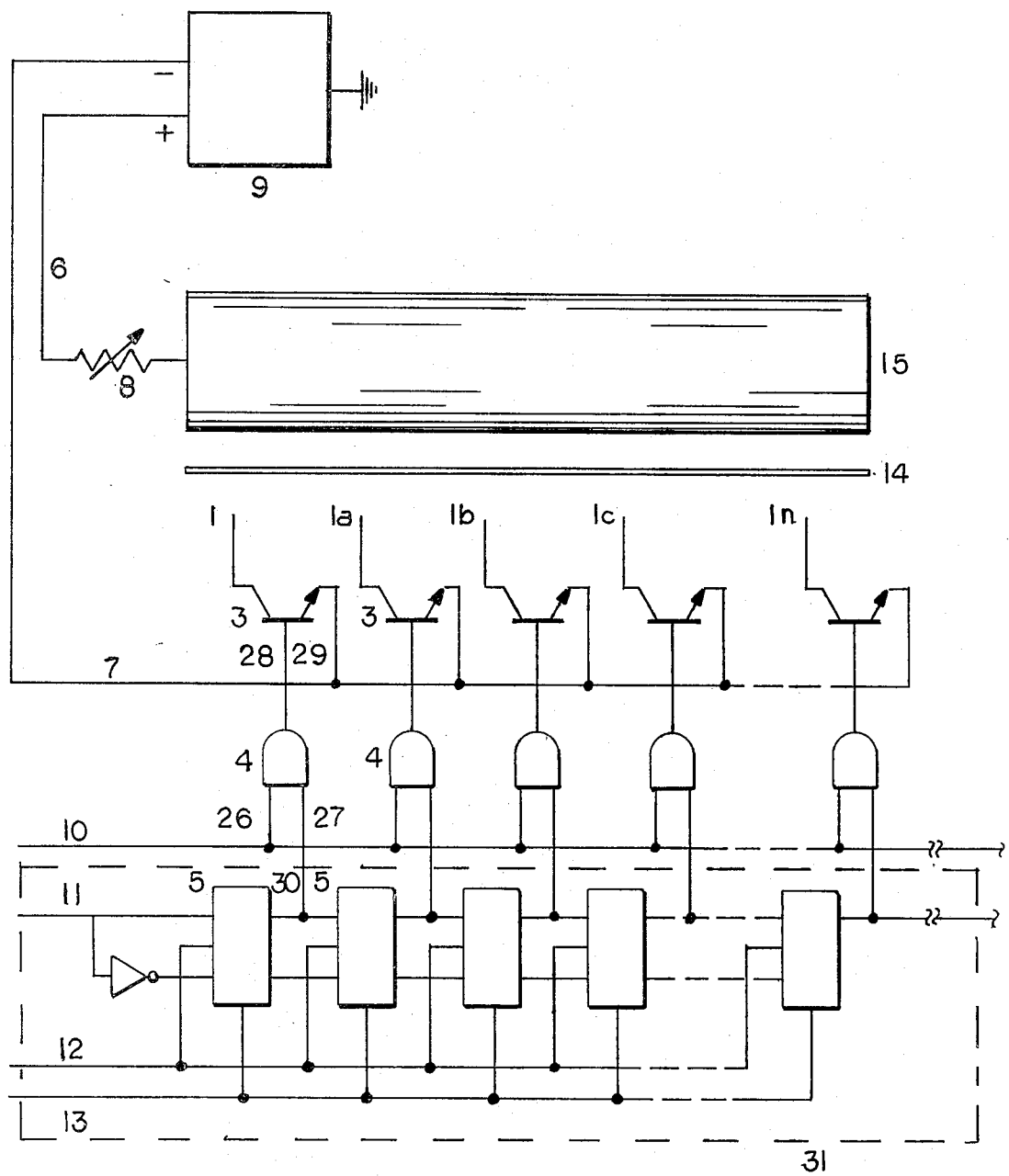
FIG. 5 is a schematic representation of electronic circuits and the relationship to the mechanical apparatus of FIG. 1 herein.

Referring now to FIG. 5 it is seen that the data input conductor 10 from input buffer 16 is a bus common to all the styli 1 by way of parallel interconnections from each stylus 1 through leg 26 of AND gate 4. Said AND gate 4 logic requires that both input conductors 26, 27 into said AND gate 4 must be turned on, or high, or receiving binary one simultaneously in order for said AND gate 4 to transmit a print signal at its output 28. A binary one applied to either conductor 26, 27 of AND gate 4 and a binary zero applied to either conductor 26, 27 of AND gate 4 will result in said AND gate 4 transmitting no binary one print pulse.

Again referring to FIG. 5, it is seen the other input conductor 27 of AND gate 4 is connected to the parallel output port 30 of the serial in, parallel out shift register 31. Said shift register 31 is connected so as to operate in a left to right fashion. After the shift register 31 is cleared by the application of a clear or reset pulse to conductor 13 as shown in FIG. 6, a single binary one is injected through input port 11 on the extreme left. The application of every clock pulse on conductor 13 causes said binary one signal to shift one stage 5 to the right. Repetitive clock pulses cause said binary one to be shifted progressively from the leftmost stage 5 of shift register 31 to the rightmost stage 5 of shift register 31, where it is then shifted out of the shift register 31. As it is shifted out, another binary one is applied to the leftmost port 11, as seen in timing chart FIG. 6, causes the process to repeat, and continue to repeat in such a fashion that shift register 31 continually recirculates a single binary one, all the rest of its stages being occupied by binary zero. Now, since shift register 31 is of the serial in, parallel out kind, the movement of data from stage to stage 5 within said shift register 31 can be read out at the parallel output ports 30 via conductor 27, which are connected to AND gates 4. Assuming no binary one is on the data bus 10, the single recirculating binary one inside shift register 31 will selectively energize one input leg 27 of one AND gate 4 after another in a progression moving from left to right one AND gate 4 per one clock 17 pulse, exactly corresponding to the movement of the recirculating binary one inside shift register 31. Every clock pulse in a cycle, then, will find a different AND gate 4 halfway open via the binary one applied to its input conductor 27. Only the AND gate 4 which is in contact with the recirculating binary one will be halfway open, and all the others will be closed. The application of a binary one to the data bus 10 is common to all the And gates 4 through input conductor 26. Thus, a binary one applied to the data bus 10 will always find one AND gate 4 halfway open, and will itself be able to open it the rest of the way. All AND gates 4 not in contact with both the binary one in shift register 31 and the binary one on data bus 10 will transmit nothing, being logically closed. So the AND gate 4 to which the two binary ones are simultaneously applied via its conductors 26 and 27 will be opened for one clock pulse, and transmit a binary one, which is effectively the binary one from data bus 10, which corresponds to incoming print commands.

In the aforementioned fashion the print head 2 of the present invention progressively opens and closes a single gate 4 at a time in a left to right direction cyclically until every gate 4-4n in the print head 2 has been accessed per each raster scan. For each raster scan the cycle repeats itself. So, if as the gates 4 are cycling opened and closed during repeated raster scans, data signals are applied to the data bus 10, in an order corresponding to the printing or no printing, binary ones will cause a stylus 1 to print and binary zeroes will cause a stylus 1 to not print. This print, no print order will correspond exactly to the scanning of the sensor or sending unit from which the signals originate, and the autonomic print head 2 time sequences itself so its selective styli 1 will exactly correspond to the selective signals as they are sent from the point of origin, resulting in the creation or recreation of the desired printed spaces and white spaces patterns.

In the aforementioned manner the pulsed gate 4 signals are combined with the pulsed print/no print signals to provide selective addressing means for arriving data. Referring to FIG. 5, and said print head 2 having delivered a binary one print signal to the base of a high voltage switching transistor 3 on conductor 28: High voltage switching transistor 3 is connected via conductor 29 to a regulated, current limiting power supply 9 supplying a negative 600 volts. Transistor 3 is biased in the off condition until a pulse is applied to its base on conductor 28, which biases it into the on condition for the duration of the applied pulse, which corresponds to the duration of one complete clock pulse in this instance. In the on condition a circuit is temporarily created between the tip of stylus 1 and power supply 9. Power supply 9 is also applying a positive 600 volts in the present example to the conductive crayon electrode 15. The tip of stylus 1 at a negative 600 volts is separated by a piece of paper 14 from the crayon 15 at a positive 600 volts. The potential difference between the −600 volt stylus 1 and the +600 volt crayon 15 is 1200 volts, with a current of about one milliamp. The time period during which the transistor 3 is left on depends on the specific use, and is normally in the range of a few hundred nanoseconds to 4 or 5 microseconds. Voltage, current, and time are proportional per the chart in FIG. 7. While the high voltage potential exists a dynamic charge transfer occurs wherein current from the crayon 15 which is the positively charged electrode, begins to flow in circuit fashion toward the negative electrode 1 and power supply 9. Although the entire crayon 15 is positively charged, the unit area over which the 1200 volt difference is spread is concentrated to a needlepoint area 0.001 inches in diameter, which is the diameter of the printed conductor of stylus 1. The potential difference being very high, and the active area being very small, micro-portions of the positively charged crayon 15 break away from the body of said crayon 15 and begin to move with considerable force and velocity toward the point sized negatively charged electrode 1. Just as the crayon 15 particles begin to move, the transistor switch 3 turns off the current flow, removing any further charge transfer impetus before it builds up to a point where electrical arcing will occur which burns a hole in said paper 14. The crayon material 15 has just begun its movement toward the source of the attraction 1, only to be stopped by the barrier layer of paper 14, into which said crayon material 15 impacts with sufficient force to become bonded to the paper 14. At the instant the charge transfer begins to occur, a small amount of heat is also created, and the eroded crayon material 15, being of microscopic size and mass, and being composed partly of a thermoplastic material, begins to soften with the application of the heat, the switch being turned off, however, before said material attains a fully molten liquid state, (unless such a molten condition be required and the formulation changed accordingly). The heat-softened thermoplastic of the crayon material 15 helps bond it to the paper 14 when said material impacts into the random lattice of paper fibers by the dynamic current flow to the other side of the paper 14. Immediately upon contacting the relatively cool paper 14, the semisolid crayon material 15 gives up its small amount of contained heat to the more massive paper fibers, resulting in an almost instantaneous hardening process taking place, adding a thermally induced bonding effect to the aforementioned impact induced bonding effect of said crayon material 15 to said random lattice of paper fibers 14.

The amount of energy expended to print via the present disclosure is considerably less than for other known systems because said writing substance, the pigmented crayon material 15 is already in direct contact with the paper 14 at the location where it is to be printed, not being necessary to transfer it from some other source, or to remove any excess, or to cause it to be dried or developed in any way. The function performed by said printer is to cause bits of the crayon 15 already in contact with their destination to remain there, said function being caused by electrodynamic deposition. The average energy expended being in the neighborhood of less than one microwatt per dot, generally a typical print head will consume in the neighborhood of one or two watts in continuous operation, not including the operation of the logic components and their energy consumption, but only the direct printing action itself.

Figure 7:
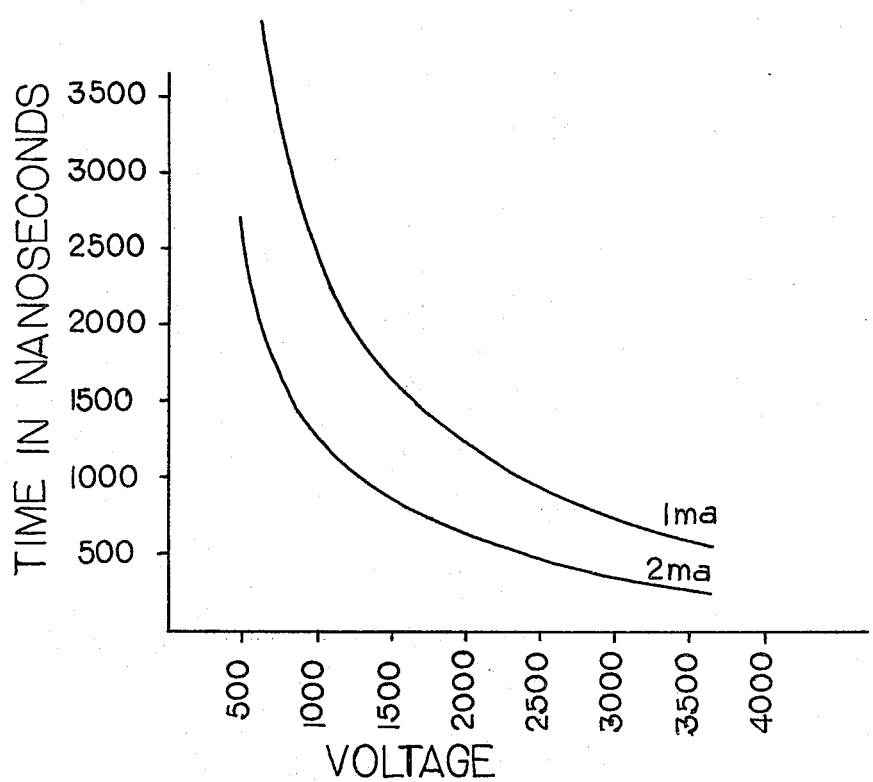
FIG. 7 is a graph illustrating proportional relationships with respect to voltage and time for two current levels.

It is of critical importance to the present disclosure to observe several facts at this point. Said crayon material 15 is eroded from said crayon 15 by a very concentrated dynamic flow of electric current just entering its formative stages. Said current charge characteristics are such that unless stopped almost immediately after beginning, said crayon material 15 may be reduced to a fully molten state wherein it may be transported entirely through the paper 14 barrier to the negative electrode 1, at which negative electrode 1 said crayon material 15 may be decomposed by the process of electrolysis and destroyed. Under certain conditions a fully liquid state may be desirable, and said crayon formulation 15 and timing may then be adjusted to accommodate. Crayon material 15 being pulled into contact with said negative electrode 1 will also produce soiling of the electrode 1, or many electrodes 1–1n, and possible consequent transferrance of said soiling matter to the back side of the writing paper 14 where it is not wanted, and is a detriment to the printing process. Letting too much energy transfer may also result in a visible hole being burned in the paper 14, further decreasing resistance to even more current flow, creating an arc and undue erosion of the crayon 15. Using the herein disclosed data the subject of the present disclosure can be manufactured to produce consistently reproduceable printing results derived from electronic inputs. It is also to be noted that even the most uniform papers are remarkably non uniform materials whose properties vary from page to page, and from area to area within a page. It is further noted that the insertion of a paper between two electrodes comprises a capacitor, and at a critical voltage said capacitor will break down, and flashover occurs, destroying said capacitor. From area to area on a non uniform sheet of paper said threshold value will vary widely, thus if said electrodynamic printing process attempts to operate at as close a value as possible to the average threshold value, that value being in the range of 400-500 volts for most common papers, the local properties of the paper will vary so widely from that set average value as to probably prevent printing in a high threshold area, print well in average threshold areas, and flashover, burning holes in sub threshold areas. Said varying properties of said ordinary papers are impractical to eliminate and serious enough to make electrodynamic printing ineffective if it uses voltages very closely matched to said average threshold values. By altering said voltage values so as to make the amount of variation in the threshold voltage a very minor quantity relative to the magnitude of the voltages being used, consistently obtainable results are achieved with remarkably uniform printing being found over locally variable, page to page variable, and even extending to variations in general paper weights or kinds. The higher the voltage is raised, the faster and more uniform the printed dots become, and the lower the current becomes, with the amount of material 15 eroded being a function of current. FIG. 7 references the trade-offs in time-voltage-current, and it is found that crayon material 15 efficiency is a fourth variable contributing to the effectiveness of high voltage printing as the crayon material's 15 conductivity increases in a non-linear fashion with increased voltage, unlike metals. Since the amount of crayon 15 printed onto paper 14 is a function of current, and the same current transfer can be achieved with different values of the times and voltages and currents listed in FIG. 7, it might be assumed the resultant print quality will also remain the same, but varying said values dramatically alters the appearance of the printed dots. Raising the voltage and decreasing the time generally produces harder, sharper, more uniform dots, while lowering the voltage and increasing pulse duration generally results in larger, softer dots. Dot size is dependent almost solely upon speed, while dot intensity is more a function of the material 15 itself, but still related strongly to the electrical parameters. Speed and resolution are inversely proportional from the standpoint that more data bits are required to print a given image in high resolution than the same image at a lower resolution, which means more print pulses have to be applied to print the same given image with a higher resolution causing the input device to work harder, but raising the voltage will permit the printer to process the data bits at a faster rate.

The nature of the crayon material 15 of the present invention, and the nature of the method of application of said crayon material 15 to said paper 14 of the present invention, and the speed with which an autonomic print head 2 of the present invention causes said crayon material 15 to be deposited upon said paper 14 will be described in further detail. The nature of each individually deposited isolated dot of said crayon material 15 is normally such that the bulk of said printed dot rides rather high upon the surface of the paper 14, instead of being absorbed completely into the paper fibers as are liquid inks, or instead of being composed of dried bonded particles, as are powdered carbon toners. The surface and visual appearance of said dots are fairly independent of the paper they are deposited upon due to this resistance of said dot material 15 to penetrate well into the fibers of the paper 14, which would bring the paper 14 fibers closer to the surface film of said dot, bringing said paper fibers into greater importance in the appearance of the printing. Crayon 15 formulae can permit any desired degree of penetration but in general the more crayon material 15 remains on the surface of the paper 14, the more uniform will be the printing over a variety of paper kinds.

Print quality is further improved by the close spacing of the styli 1 in the autonomic print head. The styli 1 are smaller than the dots they print, and closer together than the diameter of the dots they print, so the printed dots overlap and print doubly over a considerable portion of their covered area. Such double black printing intensifies the color, making it more uniform, and helps to eliminate unprinted white spaces, and aids in running the discrete dots together to lessen the stepped effect produced on curved or diagonal lines printed with a dot matrix technique. The greatest advantage of the present disclosure, however, is that the nature of the crayon material 15 may be such that as a continuous array of dots is being printed at a very rapid rate, for example to form a continuous straight or curved line, the electrically conductive nature of the first dot deposited onto the paper 14 is such that it electrically eases the creation of the second deposited dot in such a way as to seem that the second down dot is feeding off said first down dot by first depositing arriving crayon material 15 inside the border of the first down dot, and said deposition of said crayon material 15 progressively depositing in such a way that the second down dot seemingly flows out of the body of the first down dot instead of being deposited independently thereof. This parasitic effect is observed on a very short time scale in the low nanosecond range. Said electrically seeded parasitic effect is further enhanced by the thermoplastic nature of the dot material 15. When said first down dot is deposited it has been electrodynamically warmed enough to soften the material 15 therein which rapidly begins to cool and resolidify upon impacting the relatively cooler paper 14 and being pulled somewhat into the fibers thereof. However, within a very short time after its deposition, said time being measured in nanoseconds which is the pulse cycle of the more rapid printers of the present disclosure, additional warm crayon material 15 begins to impact upon the still not entirely cooled mass of the first down dot, the impacting mass warms up the first mass to a more plastic state so that as the second mass impacts upon the first, a very slow impact-splash more resembling a flow is observed, possibly aided by the surface tension of the viscous mass so that again the second down dot is aided by the first down dot in such a way that it flows out of the body thereof, lessening the hills and valleys therebetween and producing a smoother-than-dot-matrix line. Said lines and figures produced by the method of the present disclosure are thus rectilinearized and curvilinearized so as to more resemble printing press formed printing than dot matrix formed printing. On a microscopic scale the random fibers of the paper 14 cause some distortion of the aforesaid results, but not of any worse degree than with conventional printing. Crayon formulae 15 can be varied as described herein to provide for either more or less fluidity with more or less penetration into the paper 14. The higher the melting point of the crayon 15, generally the lesser the penetration of the material 15 into the paper 14, with the most extreme case being given for the following formulation for a material 15 which stands perceptibly above the surface of the paper 14 like a hard plastic dot, and which can be read in tactile fashion by the blind, or used for other raised ink printing. The mileage of a crayon material 15 is a function of how much of it is deposited onto the paper in a use; normally one pound of material 15 may be expected to print about 90,000 to 110,000 square inches of paper. The diameter of a crayon roller 15 is therefor a function of the end use and mileage expected of it, but may vary from anywhere around ⅛ inch to several inches. A typical typewriter embodiment might be satisfied with a roller 15 about ½ to 1 inch diameter. In the present invention the crayon roller 15 is both a mechanical component which holds the paper against the print head 2, and the store of the pigmented writing material 15 which is transferred by high voltage erosion processes to the surface of the paper 14. Said crayon roller 15 is of a substance which permits the conductivity of high voltage electric currents in the range of about 400 volts to 6000 volts at about 250 microamperes to 8 milliamperes without damaging effects to the materials therein. The crayon roller 15 is a solid with a variable hardness range and melting point, and is mounted around a deformed electrically conductive shaft 16. Said shaft 16 is deformed so as to prevent the thermoplastic mass 15 from slipping relative to it in either a lengthwise or a circumferential direction. The exact nature of said shaft 16 deformation is noncritical so long as it accomplishes the objective of maintaining a non slipping contact between the shaft 16 and the mass of the crayon 15. Should the mass of the crayon 15 become loose upon shaft 16 it would generate an element of uncertainty in the transferrance of electric pulses which may become as short as only a few nanoseconds duration. Said shaft 16 has at its ends press-applied bearings which facilitate the placement of said shaft 16 ends into housing 18 located at either end, and for the purposes of providing a good electric contact through brushes 33 between the crayon roller 15 and its power source 9, and for permitting the crayon roller 15 to freeroll as frictionlessly as is practical. Said bearings 17 are of commonly available type, and are fitted into the groove of a channel 18 of insulating plastic such as nylon which permits a back and forth movement for adjustment. Pressure against the shaft bearings 17 in either direction in channel 18 is exerted by springs 20, 21, and 22, and sliding bar 19. Said pressure is exerted by external means against bar 19 for purpose of moving crayon 15 directionally toward and against the paper 14 and print head 2 so printing may be accomplished, or directionally away from the print head 2 so as to release contact between crayon 15, paper 14, and print head 2 for various reasons. Plastic insulating channel 18 is in turn attached to whatever container may be designed to contain the printer. Said preceding components are illustrated in FIG. 4.

Figure 4:
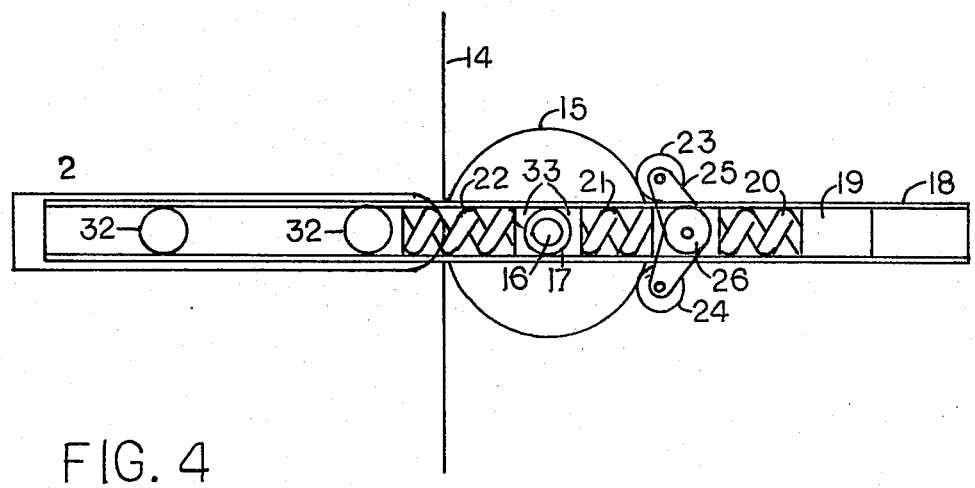
FIG. 4 is a side view of the mechanical configuration of the apparatus of FIG. 1.
Figure 3:
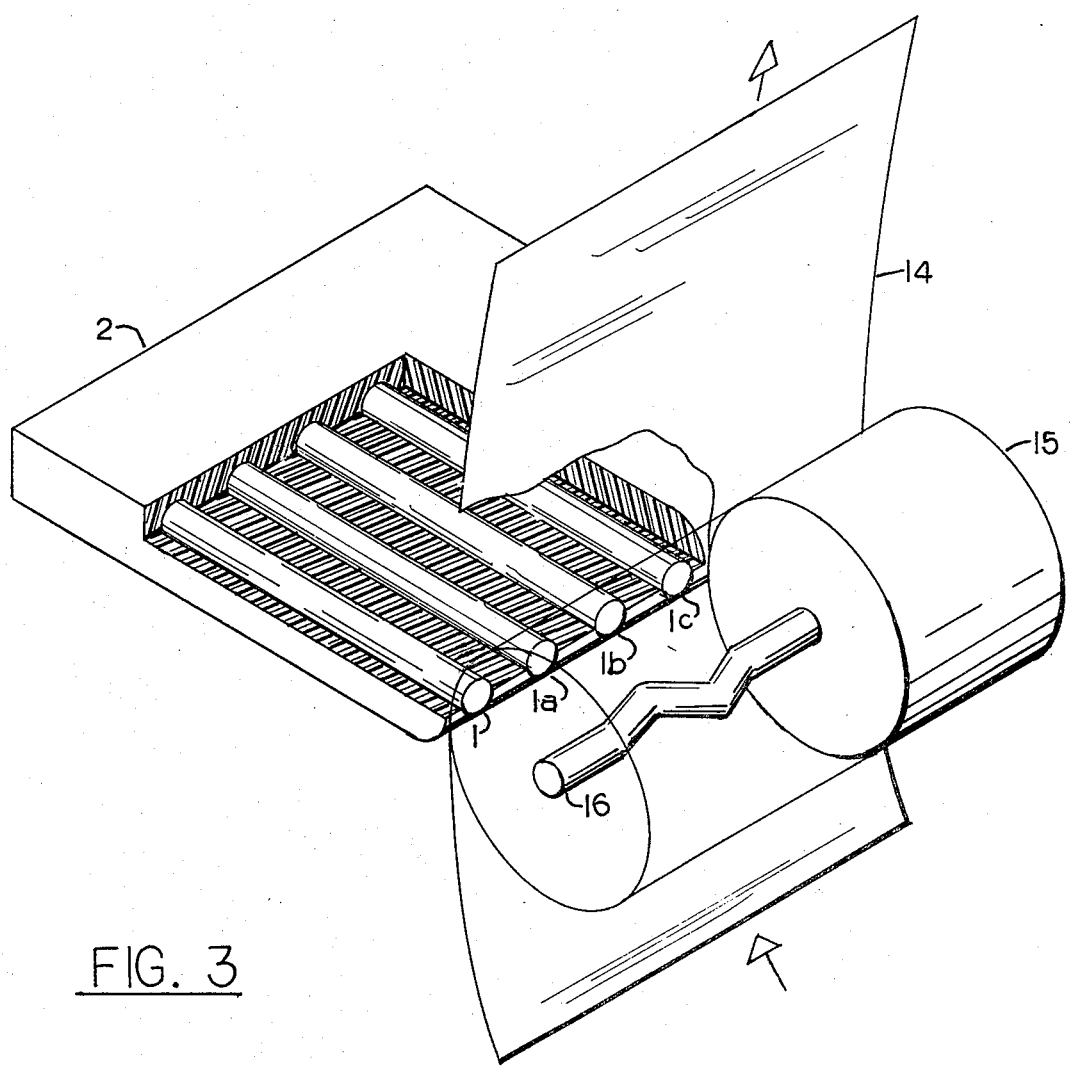
FIG. 3 is an enlarged partially cutaway perspective view illustrating a detail of the printer system of FIG. 1.

The rollers 23 and 24 which are also illustrated in FIG. 4 have a force exerted against them by insulated plastic springs 20 pushing them against crayon roller 15. These rollers 23, 24, mounted on pivot 26 are for the purpose of maintaining the surface of the crayon roller 15 in a smooth condition, which they do by applying a force onto the surface of the crayon 15 which smooths out the surface thereof as it becomes progressively roughened by the process of erosion which removes small bits of it. Such surface roughening is generally deleterious to the operation of the printer. The force exerted by the resurfacing rollers 23, 24 is dependent upon the formulation of the crayon material 15 as various hardnesses of the formulation are provided. For high temperature, high melting point crayons 15 the first resurfacing roller shall be heated to the softening point of the material formulation as mechanical pressure alone is not quite effective in smoothing out said harder varieties of the crayon formulation 15. In this case, the second roller 24 is maintained in a cool state so as to aid in smoothing and returning the crayon 15 to a more solid state. In all cases the resurfacing rollers 23,24 are electrically insulated from other parts of the device and the enclosure since they are in contact with the electrically charged crayon 15.

The formulation of the printing component 15 contains a mixture of materials which may be varied to provide different ranges of properties. First, the material substance, whatever the formulation, is required to meet the following general mechanical parameters: Said substance 15 is molded into a cylindrical roller configuration 15 containing an axle 16 upon which it rotates; aforementioned springs 20, 21 exert a force against said axle 16, which force is in turn exerted by said crayon roller 15 against the paper 14, and print head 2 without crumbling or visibly marking the paper. The crayon material is a solid, but fairly loosely bonded solid of a highly pasticized nature. It maintains its shape under pressure, but in the conduction and flow of electricity to the print head 2 bits of the crayon material 15 are eroded from the surface thereof, said erosion being aided by the lubrication properties of the plasticizing agent so as to allow parts of it to separate easily. Said eroded bits leave behind holes which are effectively smoothed over by the set of resurfacing rollers 23, 24. During aforementioned mechanical and printing functions, said crayon material 15 does not transfer undue amounts of itself to internal parts of the printing device of the present disclosure, requiring it then to be removed by cleaning therefrom. Nor are the component ingredients such that will corrode or otherwise damage the parts of the printing device, or emit caustic or hazardous, or annoying gases or fumes during said high voltage printing process, as the ingredients are of relatively inert materials. The material 15 printed onto the paper 14 provides immediately readable, legible copy with archival properties expected of normal printing.

The chemical non-specificity of the present disclosure permits that special admixtures may be made to alter or eliminate most desired properties, or to create or emphasize a new property. The ingredients consist mainly of thermoplastic waxes derived from the latter fractions of petroleum and include mainly microcrystalline wax, and paraffin wax. Other animal or vegetable waxes have been found to work, but not with the degree of success and economy the petroleum waxes have shown. The themoplastic waxes alone are generally improved by the admixture of other waxes or other thermoplastic agents such as polyethylene, ethyl cellulose, nitrocellulose, and polyvinylchloride, among others, generally in small amounts. The most practical method of preparing a blend of ingredients is generally to heat said ingredients to their molten state in a kettle with gentle stirring. In the molten, liquid state said ingredients are miscible in almost any proportion. Stirring should be gentle so as to avoid entrainment of air bubbles. Temperatures should not be raised significantly above the melting point of the ingredient with the highest melting point in a batch or sustained there longer than required as most waxes oxidize more rapidly at elevated temperatures. Although said oxidation is not a very rapid process, or of hypercritical nature, it generally causes deterioration and an undesirable darkening of the color of the waxes. Said waxes have been chosen largely for their lack of color so as to permit a total range of coloring agents to be used without undesirably darkening or adnubilating any of said colors. In the following formulae are disclosed pigments for simple colors. Compound colors are formed by the admixture of said simple colors if said compound color cannot be obtained ready mixed. Also it is noted that the general kinds of materials used herein are such that their quality or certain properties may vary by a small amount from lot to lot, which variation may alter the required proportions of said ingredients in said formulae if it is found that the asked for quantity of one ingredient seems insufficient or oversufficient. It is a desirable feature that an error or unexpected variation in one or more ingredient need not ruin a batch as further addition of smaller or greater amounts of other ingredients may correct said variation. Upon completing a batch mixture and allowing it to harden in molds and at that time discovering undesirable properties, the entire batch may be remelted and remixed to correct for said undesirable properties. In general, the mixtures should contain as much of the pigmenting agent as can be mixed in and which will still exhibit a wetted, waxy appearance when solidified. Said pigmenting agents must be thinly coated with said thermoplastic so as to prevent any excess of said thermoplastic vehicle from bleeding into the paper or forming annular rings around said pigment dot. The ratio of pigment to vehicle is also such that there is a sufficient amount of protective coating over the pigment particles as to permit their color not to be transferred by mere contact. Following are sufficient formulae and properties references as will fully explain the nature of the crayons used in the electrodynamic printing process:

In the preferred formulation, microcrystalline wax, or paraffin wax which has been exposed to gamma radiation within the range of about $2 \times 10^6$ to $100 \times 10^6$ roentgens, or to a beam of fast electrons is converted from a normally dielectric state to an electrically conductive state. (See U.S. Pat. No. 3,014,854, Wm. Elliott et al) Said electrically conductive wax may then be intermixed with other waxes to improve the properties of the primary vehicle. Paraffin wax melting point range is 128° F. to 168° F. and may be increased by mixing with portions of microcrystalline wax which has a melting point as high as 190° F., or with a small percentage of Ross Wax 160 to further increase the melting point range. 2 to 5% low molecular weight polyethylene may be added to provide tougher, more scuff resistant printing, and to increase the hardness of the crayon, and to increase the melting point. Then, virtually any of the coloring agents used in the printing industry may be blended in to give the desired color, being careful to avoid those pigments which have toxic properties. Such pigments may include, but are not limited to X-48 yellow lead free, synthaline green, peacoline blue, brilliant orange RS, brilliant red 2R, as supplied by the Hilton-Davis Chemical Co., San Francisco.

Another formulation may be as above but with electrical properties supplied by the addition of carbon black rather than irradiation. Any wax mixture is used, but black is the only color choice. At least 35% carbon black is added, and it is preferred to add as much as the molten wax will effectively wet to reduce the amount of vehicle in proportion to carbon black. Various grades of carbon black will alter the amount which can be added. Carbon blacks are available with particle sizes ranging from 100 to 5000 angstroms and with surface areas ranging from 1,100 square meters per gram for the 100 angstrom grade to 6 square meters per gram for the 5000 angstrom grade. Smaller particle size grades are the blackest and also require more vehicle because of the greater surface area, and also print the sharpest. The carbon black/wax mixture should exhibit a glossy look rather than a dry, flat look to avoid contact smudging. Another formulation may be as any of the above, but using a chemical agent to supply the means of electrical conduction. Chemical antistatic agents of the internal kind as used in the plastics industry, and as referenced in Modern Plastics Encyclopedia, may be used with the exception of quaternary ammonium compounds. Generally the antistat is more effective if dissolved in a plastic such as polyethylene, with which it is more compatible, in amounts of about 5% when being mixed with paraffin wax or microcrystallin wax. However, polyethylene will precipitate as the molten liquid cools, forming a non-homogeneous mass unless after the polyethylene and antistat are mixed into the melt, a sufficient bulk of pigmenting agent, generally in the range of 35%, is mixed in to yield a thick, viscous paste which in itself helps to maintain the integrity of the mixture as the mixture cools below the melting point of polyethylene. Antistats such as Alcastat C2, Armostat 310, and Armostat 375P, among others, in amounts of about 0.2% to 5% are usually effective in converting the dielectric mass to an adequate electrical conductor. If carbon black is used, a chemical antistatic agent is not required as carbon black is an antistatic agent itself.

In another formulation the ingredients may be as any of the above but with the addition of about 5% vinyl copolymer and a vinyl copolymer compatible antistatic agent such as Lubrol RO-O, Varstat T-22, and Drewplast 029 and 032 substituted for polyethylene and the polyethylene antistat, with vinyl offering slightly different surface film properties. Another formulation may be as any of the above but with the addition of 42% or 70% chlorinated paraffin wax being substituted for all or part of the non-chlorinated paraffin wax for its flame retardant properties.

Another formulation may be as any of the above but with the addition of about 50 to 62% thermographic resin of a proprietary formulation, but of the kind used in the Vercotype process in the printing industry. Thermographic resin swells and fuses on the page with the application of the heated print pulse to provide a raised-ink printing effect suitable for special applications. Thermographic resin is heat sensitive and so must be mixed with the other thermoplastics and pigments, etc. without the application of heat, and this is accomplished with solvents such as chloroform, carbon tetrachloride, turpentine, or pinene. Such solvent mixing is contraindicated for health and safety reasons and very adequate ventilation and fire protection measures must be provided. All formulations listed herein may be mixed with solvents instead of heat, but should only be done if absolutely necessary.

In the previous formulations the use of ingredients should be determined by the following list of properties, or by reference to such books a Industrial Waxes by H. Bennett for lists of other compatible ingredients and their properties.

Microcrystalline wax and paraffin wax are similar in nature but microcrystalline wax is more suitable for use alone with just pigment agents whereas paraffin wax is so soft and of such low melting point it should be mixed with other thermoplastics. Paraffin wax melts at about 57° C. and microcrystalline wax melts at about 88° C., depending upon the grades. Both waxes are miscible in all proportions to manipulate the melting point. Microcrystalline wax imparts a generally tougher, glossier, more flexible property to the resultant print than does paraffin wax, which is softer, and more easily liquified during printing. Ross Wax 160, by the Frank B. Ross Co. can be added to either paraffin wax or microcrystalline wax to significantly raise the melting points and hardness levels. A 50/50 mixture of Ross Wax 160 with paraffin wax will raise the melting point to 149° C., with the same proportion Ross Wax 160/Microcrystalline wax having a melting point of 154° C. Polyethylenes such as A-C Polyethylene by Allied Chemical Corp. are miscible in all proportions with paraffin wax above a melt temperature of 210° F., and generally reduce the penetration of the wax into the paper, and provide a tougher, more scuff-resistant print, and act as a good vehicle for antistatic agents. But addition of too large a proportion of polyethylenes can result in a crayon so tightly bound together as to almost halt the erosion process used in the present invention as a printing technique. Generally 2% to 5% polyethylene will noticeably improve the paraffin wax properties while avoiding the problems of over-hardness. Polyethylenes must be mixed as noted earlier to prevent precipitation as the mixture cools. When said thermoplastic crayon material 15 is in a molten condition and is poured into molds to cool and solidify, if said mold is several to many degrees colder than the temperature of the molten thermoplastic, a thermal shock will occur which causes the surface layer of the hardening thermoplastic to chase away the chemical antistatic agents and harden relatively in a pure or non-conducting state. As this is an adverse condition, it is reccommended that all molds be heated to the same temperature as the molten materials being poured into them, or that the surface layer of approximately 0.020 inches of the crayon 15 be removed by such milling process as will remove the dielectric layer, and leave a smooth, rounded cylinder shape.

In addition to being made in the form of a solid cylindrical roller 15 as in the present preferred embodiment, said electrodynamic crayon material 15 may also be presented in different forms, such as being pulverized into granular or powdered form, or applied as a film to a ribbon carrier, or to be used while in the liquid molten state, or any such similarly varied forms, states, and natures as might be required for certain specific applications.

What is claimed is:

1. An electrodynamic printing system comprising, a back electrode having at least one conductive stylus,
a front electrode having a store of conductive imaging material spaced from the back electrode,
means for mounting an image receiving sheet between said electrodes in close, material transfer relationship to the front electrode, and
means for applying current pulses between said electrodes to cause current conduction between said electrodes through said sheet to erode a portion of said conductive writing material and transfer the eroded material to said sheet.

2. The electrodynamic printing system of claim 1 further defined by said circuit means having a signal means for applying across said electrodes a voltage exceeding the conduction threshold voltage.

3. The electrodynamic printing system of claim 1 wherein said imaging material includes a thermoplastic vehicle having been converted to an electrically conductive state, forming a conductive crayon.

4. The electrodynamic printing system of claim 3 wherein said front electrode further includes coloring agents mixed in suspension in said thermoplastic.

5. The electrodynamic printing system of claim 3 wherein said front electrode further includes coloring agents in solution with said thermoplastic vehicle.

6. The electrodynamic printing system of claim 3 wherein said thermoplastic vehicle consists substantially of wax.

7. The electrodynamic printing system of claim 6 wherein said wax consists substantially of microcrystalline wax.

8. The electrodynamic printing system of claim 6 wherein said wax consists substantially of paraffin wax.

9. The electrodynamic printing system of claim 6 wherein said wax is colorless.

10. The electrodynamic printing system of claim 6 wherein said wax includes 2%–5% polyethylene and is made conductive with polyethylene compatible antistatic agents.

11. The electrodynamic printing system of claim 6 wherein said wax includes approximately 5% vinyl copolymer and is made conductive with vinyl copolymer compatible antistatic agents.

12. The electrodynamic printing system of claim 3 wherein said writing material is formed into a cylindrical roller having means for rolling relative to a side of said sheet.

13. The electrodynamic printing system of claim 12 wherein said circuit means includes an elongated conductor axially disposed within said cylindrical roller.

14. The electrodynamic printing system of claim 12 wherein spring means are connected to said roller for urging said roller toward said back electrode.

15. The electrodynamic printing system of claim 12 wherein means for smoothing the outer surface of said roller are disposed adjacent to said roller.

16. The electrodynamic printing system of claim 12 wherein the cylindrical roller is rotatable about a fixed axis, and additionally comprising means for moving the sheet relative to said axis.

17. The electrodynamic printing system of claim 1 wherein said conductive material comprises wax previously exposed to ionizing radiation for a duration and an intensity coverting said wax to an electrically conducting state.

18. The electrodynamic printing system of claim 1 wherein said conductive material comprises antistatic agents.

19. The electrodynamic printing system of claim 1 wherein said conductive material comprises carbon particles.

20. The electrodynamic printing system of claim 19 wherein the concentration of carbon particles is greater than 30 wt. %.

21. The electrodynamic printing system of claim 1 wherein said back electrode comprises a dot matrix array of styli.

22. The electrodynamic printing system of claim 21 wherein said array is substantially linear.

23. The electrodynamic printing system of claim 1 wherein said sheet to be written upon is a fibrous sheet.

24. The electrodynamic printing system of claim 16 wherein said fibrous sheet is paper.

25. The electrodynamic printing system of claim 1 wherein said means for applying current pulses is connected to said back electrode which transmits said current pulses through said sheet to said front electrode.

26. The electrodynamic printing system of claim 1 wherein the image receiving sheet is in contact with the front electrode.

27. The electrodynamic printing system of claim 1 wherein the image receiving sheet is in contact with the back electrode.

28. The electrodynamic printing system of claim 1 and additionally comprising means for biasing the front and back electrodes toward one another and against the image receiving sheet mounted therebetween.

29. A process for printing on sheet material comprising,
disposing at least one conductive stylus on a back side of an image-receiving sheet,
disposing a store of conductive imaging material in close, material transfer relationship to a front side of said sheet and opposite said stylus, and
establishing a current path from the conductive stylus to the conductive writing material through the sheet therebetween, said current path established by providing a current pulse in said current path for eroding imaging material from said store, said current pulse having an intensity and a duration sufficient for causing writing material erosion from said store and adherance on said sheet, without hole formation in said sheet.

30. The printing process of claim 29 further defined by feeding said sheet between said conductive stylus and said store of conductive imaging material.

31. The process of claim 30 further defined by providing a series of sequential current pulses to said current path for forming a series of dots in rectilinear or curvilinear alignment.

32. The printing process of claim 31 further defined by spacing dots sufficiently close as to overlap.

33. The printing process of claim 31 further defined by forming a new dot overlapping an existing dot with sufficient energy to cause the new dot to flow into the existing dot.

34. The printing process of claim 29 further defined by printing with sufficient energy to cause the imaging material to penetrate a sheet of paper.

35. The printing process of claim 34 further defined by printing with sufficient energy to cause imaging the material to penetrate at least one sheet of paper and mark another laminated sheet, for printing multiple copies simultaneously.

36. The printing process of claim 29 further defined by altering the current pulse to print dots of variable diameter.

37. The printing process of claim 29 further defined by altering the current pulse to print dots of variable intensity.

38. The printing process of claim 29 further defined by disposing a plurality of conductive styli opposite said store of conductive imaging material, said styli aligned in a row transverse to said sheet.

39. The printing process of claim 29 further defined by moving said store of imaging material relative to said sheet to expose fresh areas of said store to said sheet.

40. The printing process of claim 29 further defined by arranging said store in a cylinder and rotating said cylinder relative to said sheet.

41. The printing process of claim 29 further defined by smoothing areas of said store which have become roughened by erosion of said imaging material.

42. The printing process of claim 29 further defined by including pigments to color said imaging material.

43. The printing process of claim 29 further defined by including dyes to color said imaging material.

44. An electrodynamic printing system comprising,
an array of independently addressable conductive styli,
a store of substantially solid electrically conductive imaging material adapted to erode in the presence of an electric current spaced from said array,
means for mounting an image-receiving sheet between the conductive styli and the store of imaging material in close, material transfer relationship to said store, and
means for applying current pulses between selected styli and the store of conductive imaging material to establish localized electric currents between the imaging material and the selective styli and erode portions of the imaging materials so that said portions of material are transferred to the sheet and provide an image thereon.

45. The electrodynamic printing system of claim 44 wherein the array of styli is linear.

46. The electrodynamic printing system of claim 44 wherein the store is in contact with the sheet.

47. The electrodynamic printing system of claim 44 and additionally comprising means for biasing the array and the store toward one another and in contact with the sheet.

48. The electrodynamic printing system of claim 44 wherein the localized electrical currents are initiated from the store through the sheet to the styli.

49. The electrodynamic printing system of claim 44 wherein the store is in the shape of a cylindrical roller which is rotatable.

50. The electrodynamic printing system of claim 44 wherein the mounting means includes means for moving the paper through the space between the array and the store.

51. The electrodynamic printing system of claim 44 wherein the imaging material includes a thermoplastic vehicle having been converted to an electrically conductive state and including coloring agents, forming a conductive crayon.

52. The electrodynamic printing system of claim 51 wherein said thermoplastic vehicle consists substantially of wax.

53. The electrodynamic printing system of claim 51 wherein the roller and the array are biased toward one another in contact with the image-receiving sheet inbetween.

54. The electrodynamic printing system of claim 51 wherein the imaging material is adapted to at least partially melt in the presence of an electric current and flow onto the image-receiving sheet.

55. The electrodynamic printing system of claim 44 wherein said imaging material is adapted to at least partially melt in the presence of an electric current, and wherein said mounting means comprises means for mounting the image-receiving sheet so that said sheet is in contact with the store and the melted imaging material flows onto said sheet.

56. An electrodynamic printing system comprising,
an array of independently addressable conductive styli,
a roller having an outer surface of substantially solid electrically conductive imaging material adapted to erode in the presence of an electric current, said roller being spaced from said array, means for mounting an image-receiving sheet in contact with the roller between the roller and the styli, and means for applying current pulses between selected styli and the electrically conductive imaging material to initiate localized electric currents between said selected styli and the imaging material so that portions of the imaging material proximate the selected styli erode and adhere to the image-receiving sheet to form an image thereon.

57. An electrodynamic printing system comprising a substantially linear array of independently addressable conductive styli, a roller of substantially solid electrically conductive imaging material adapted to erode in the presence of an electric current, said roller being spaced from said array, means for mounting an image-receiving sheet between the conductive styli and the roller, means for biasing the array and the roller toward one another in contact with the paper, and means for applying current pulses between selected styli and the electrically conductive imaging material to initiate localized electric currents between said selected styli and the imaging material so that portions of the imaging material proximate the selected styli erode and adhere to the image-receiving sheet to form an image thereon.

58. An electrodynamic printing system comprising, an array of independently addressable conductive styli, a roller having an outer surface including a thermoplastic conductive vehicle and color agents forming a conductive crayon, said outer surface adapted to at least partially desolidify in the presence of an electric current, and an electrode underlying said outer surface, said roller being spaced from said array, means for mounting an image-receiving sheet between the array and the roller, and means for applying current pulses between the selected styli and the electrode to initiate localized electric currents between selected styli and the electrode through the outer surface of the roller so that portions of the other surface of the roller proximate the selected styli at least partially desolidify and adhere to the image-receiving sheet to form an image thereon.

59. An electrodynamic printing system comprising, at least one conductive stylus, a store of substantially solid electrically conductive imaging material adapted to at least partially melt in the presence of an electric current spaced from said stylus, means for mounting an image-receiving sheet between the conductive stylus and the store of imaging material in contact with said store, and means for applying current pulses between said stylus and the store to cause current conduction between said electrodes through said sheet to melt a portion of said store proximate the stylus so that said melted portion flows onto said sheet to form an image thereof.

60. A process for printing on sheet material comprising, feeding the sheet material between a substantially linear array of electrically conductive styli and a store of conductive imaging material which erodes in the presence of an electric current, and establishing localized current paths between the store of conductive imaging material and selected styli through the sheet material so that localized portions of the store erode and adhere to the sheet material to form an image thereon.

61. A process as recited in claim 60 wherein said feeding step includes maintaining the sheet material in contact with the store, and wherein said store at least partially melts in the presence of an electric current and flows onto the sheet material.

62. A process as recited in claim 62 wherein said localized current paths are intermittent so that dots of material from the store erode and adhere to the sheet material and merge to form an image thereon.

63. A process for printing on sheet material comprising, feeding the sheet material between an array of electrically conductive styli and a roller having an outer surface including a store of conductive imaging material which at least partially melts in the presence of an electric current and an internal electrode, biasing the array and the roller toward one another and against the sheet material, and establishing localized current paths between the selective styli and the electrode through the outer surface of the roller and the sheet material so that localized portions of the store melt and flow onto the sheet material to form an image thereon.

* * * * *